United States Patent
Yang et al.

(10) Patent No.: US 9,077,505 B2
(45) Date of Patent: Jul. 7, 2015

(54) MIPI SIGNAL RECEIVING APPARATUS AND METHOD

(71) Applicant: Novatek Microelectronics Corp., Hsinchu (TW)

(72) Inventors: Chih-Chao Yang, Hsinchu (TW); Wei-Ying Tu, Hsinchu (TW); Yu-Hsun Peng, Hsinchu County (TW); Feng-Jung Kuo, Hsinchu County (TW); Chien-Yu Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 66 days.

(21) Appl. No.: 13/942,723

(22) Filed: Jul. 16, 2013

(65) Prior Publication Data
US 2014/0211888 A1    Jul. 31, 2014

(30) Foreign Application Priority Data

Jan. 28, 2013    (TW) .............................. 102103180 A

(51) Int. Cl.
*H04L 27/06*    (2006.01)
*H04L 7/00*    (2006.01)

(52) U.S. Cl.
CPC .......... *H04L 7/0066* (2013.01); *G09G 2330/06* (2013.01); *G09G 2370/10* (2013.01)

(58) Field of Classification Search
CPC ....................................................... H04B 14/002
USPC ........................................................... 375/340
See application file for complete search history.

(56) References Cited

U.S. PATENT DOCUMENTS

| | | | | |
|---|---|---|---|---|
| 4,893,136 | A * | 1/1990 | Curry ............................. | 347/250 |
| 5,123,009 | A * | 6/1992 | Winter ........................... | 370/287 |
| 5,673,273 | A * | 9/1997 | Almy ............................. | 714/724 |
| 2012/0324302 | A1 * | 12/2012 | Arslan et al. .................. | 714/727 |

* cited by examiner

*Primary Examiner* — Lihong Yu
(74) *Attorney, Agent, or Firm* — Jianq Chyun IP Office

(57) ABSTRACT

A signal receiving apparatus and method adapted for receiving a MIPI signal are disclosed. The signal receiving apparatus includes a signal receiver, a selector, a decoding apparatus and a byte boundary searcher. The signal receiver receives a clock signal, and obtains an input data stream according to the clock signal. The selector outputs the input data stream to a first or second output terminal according to a decoding error signal. The byte boundary searcher operates a boundary searching operation on the input data stream for generating a byte tuning information, wherein the signal receiver adjusts the clock according to the byte tuning information for adjusting the input data stream.

11 Claims, 5 Drawing Sheets

Error status lookup table

| | C1 | C2 | C3 | C4 | C5 |
|---|---|---|---|---|---|
| R1 | 0 | 80 | 44 | CE | 3F |
| R2 | 0 | 0 | 12 | 39 | FF |
| R3 | 0 | 0 | 48 | E4 | FC |
| R4 | 2 | 0 | 20 | 91 | F3 |
| R5 | 8 | 0 | 80 | 44 | CE |
| R6 | 21 | 0 | 0 | 12 | 39 |
| 87 | 87 | 0 | 0 | 48 | E4 |
| R8 | 1F | 2 | 0 | 20 | 91 |
| R9 | 7F | 8 | 0 | 80 | 44 |
| R10 | FF | 21 | 0 | 0 | 12 |

MIPI SIGNAL RECEIVING APPARATUS AND METHOD

CROSS-REFERENCE TO RELATED APPLICATION

This application claims the priority benefit of Taiwan application serial no. 102103180, filed on Jan. 28, 2013. The entirety of the above-mentioned patent application is hereby incorporated by reference herein and made a part of this specification.

BACKGROUND

1. Field of the Invention

The present invention is directed to a signal receiving apparatus and a signal receiving method and more particularly, to a signal receiving apparatus and a signal receiving method of a mobile industry processor interface (MIPI) signal.

2. Description of Related Art

In the technical field of the related art, a high-speed transmission interface which performs transmission by using packets in serial has advantages of having a high transmission rate and a low transmission pin count. In order to enhance the reliability of data transmission, a differential signal may be further used for transmission so as to mitigate the influence caused by the electromagnetic interference (EMI).

Referring to FIG. 1A, FIG. 1A is a transmission waveform chart illustrating the mobile industry processor interface (MIPI) signal in the related art. Referring to FIG. 1A, a MIPI is utilized for transmitting a video signal video signal SDIN. First, a start of transmission (SOT) signal is transmitted to provide a receiver with a basis for signal synchronization, and after the SOT signal, data packets D1~DN are transmitted sequentially. Such transmission of the video signal SDIN commonly requires a corresponding clock signal CKIN. Further, referring to FIG. 1B and FIG. 1C, FIG. 1B and FIG. 1C are schematic diagrams illustrating a transmission error of the video signal SDIN in the related art. In FIG. 1B, due to the EMI on the clock signal CKIN, a pulse PS1 which is supposed to appear disappears. As a result, a situation where the data packets D3 and D4 shown in FIG. 1B is incapable of being received occurs, which leads to data loss. Moreover, in FIG. 1C, due to the EMI on the clock signal CKIN, a pulse PS2 which is not supposed to appear appears. As a result, a situation where the data packets D4 and D5 shown in FIG. 1C are repeatedly received occurs, which leads to data error.

In order to solve the aforementioned issues, the MIPI of the related art typically avoids the error of the data packets by periodically transmitting the SOT signal. However, the repeatedly transmitted SOT signal occupies the transmission bandwidth of the data packets and results in the limitation to the transmission efficiency of the MIPI.

SUMMARY

The present invention is directed to an apparatus and a method of receiving a mobile industry processor interface (MIPI) signal capable of effectively improving the accuracy of received signals.

The present invention is directed to a signal receiving apparatus adapted to receive a MIPI signal, which includes a signal receiver, a selector, a decoding apparatus and a byte boundary searcher. The signal receiver receives a clock signal and receives an original input data stream according to the clock signal so as to obtain an input data stream. The selector has a first and a second output terminals. The selector is coupled to the signal receiver and selects to transmit the input data stream to the first output terminal or the second output terminal according to a decoding error signal. The decoding apparatus is coupled to the first output terminal of the selector and performs a decoding operation on the input data stream received by the first output terminal of the selector so as to generate the decoding error signal. The byte boundary searcher is coupled to the second output terminal of the selector and performs a boundary searching operation on the input data stream received by the second output terminal of the selector so as to generate byte tuning information. The signal receiver adjusts the clock signal according to the byte tuning information so as to adjust the correspondingly received input data stream.

The present invention is further directed to a method of receiving a MIPI signal including receiving a clock signal and receiving an original input data stream according to the clock signal so as to obtain an input data stream, selecting to transmitting the input data stream to a decoding apparatus or a byte boundary searcher according to a decoding error signal, performing a decoding operation on the input data stream by using the decoding apparatus so as to generate the decoding error signal, performing a boundary searching operation on the input data stream by using the byte boundary searcher so as to generate byte tuning information and adjusting the clock signal according to the byte tuning information so as to adjust the correspondingly received input data stream.

Accordingly, in the present invention, when a failure of the decoding operation occurs, the generated byte tuning information is searched for by performing the boundary searching operation and the clock signal is adjusted according to the byte tuning information so as to adjust the correspondingly received input data stream.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 4 is a schematic diagram illustrating an error status lookup table 400.

DESCRIPTION OF EMBODIMENTS

Figure 1A:
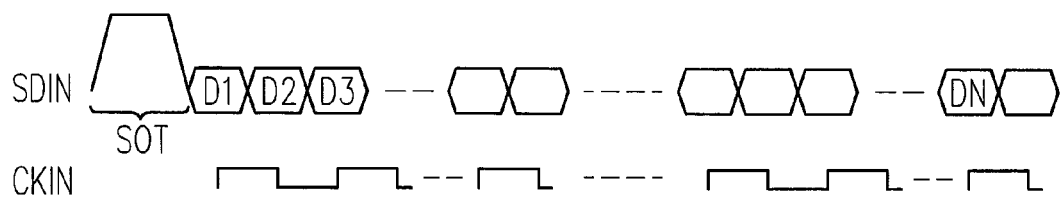
FIG. 1A is a transmission waveform chart illustrating the mobile industry processor interface (MIPI) signal in the related art.
Figure 1B:
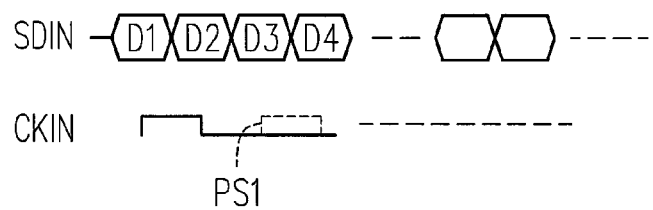
FIG. 1B and FIG. 1C are schematic diagrams illustrating a transmission error of the video signal SDIN in the related art.
Figure 1C:
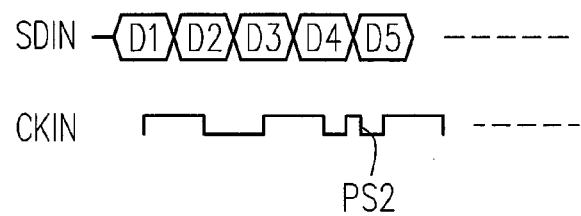
Figure 2:
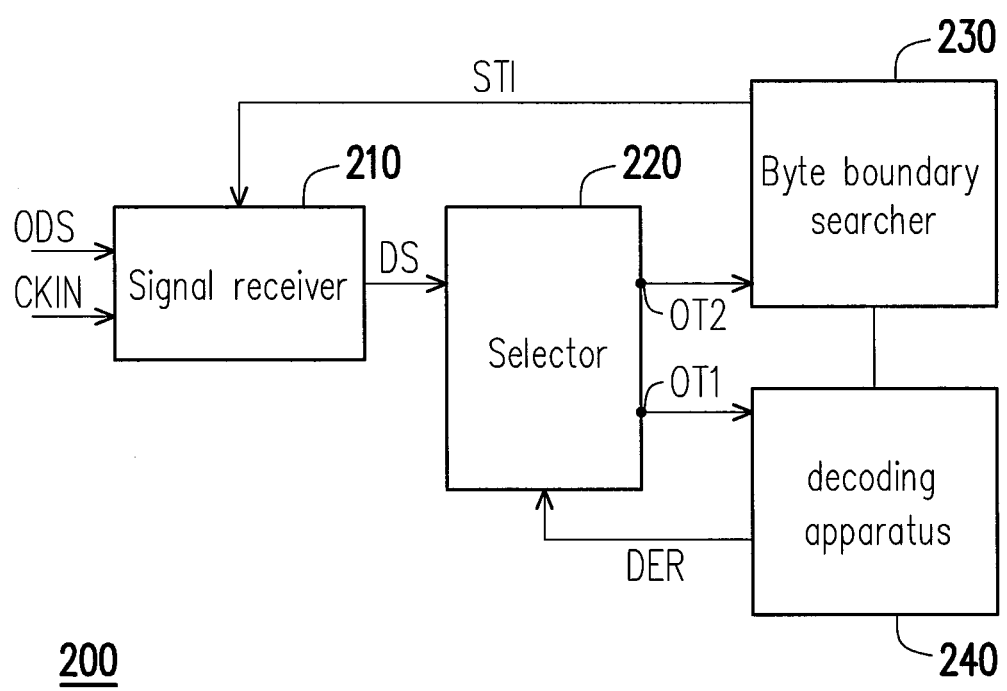
FIG. 2 is a schematic diagram illustrating a signal receiving apparatus 200 according to an embodiment of the present invention.

Referring to FIG. 2, FIG. 2 is a schematic diagram illustrating a signal receiving apparatus 200 according to an embodiment of the present invention. The signal receiving apparatus 200 is adapted to receive a mobile industry processor interface (MIPI) signal. The signal receiving apparatus 200 includes a signal receiver 210, a selector 220, a byte boundary searcher 230 and a decoding apparatus 240. The signal receiver 210 receives a clock signal CKIN and receives an original input data stream ODS according to the clock signal CKIN to obtain an input data stream DS. The selector 220 has a first and a second output terminals, OT1 and OT2. The selector 220 is coupled to the signal receiver 210. The selector 220 select to transmit the input data stream DS to the first output terminal OT1 or the second output terminal OT2 according to a decoding error signal DER. The decoding apparatus 240 is coupled to the first output terminal OT1 of the selector 220. The decoding apparatus 240 performs a decoding operation on the input data stream DS received by the first output terminal OT1 of the selector 220 so as to generate the decoding error signal DER. In brief, the decoding apparatus 240 performs the decoding operation on the input data stream DS and reacts on the decoding error signal DER depending on whether the decoding operation is successful or not. For instance, if determining that the decoding operation on the input data stream DS is a failure, the decoding apparatus 240 may generate, for example, the decoding error signal DER at a logic high level. On the other hand, if determining that the decoding operation on the input data stream DS is successful, the decoding apparatus 240 may generate, for example, the decoding error signal DER at a logic low level.

Certainly, the relationship between whether the decoding operation is successful and the logic level of the decoding error signal DER as described above is only an example, and constructs no limitations to the present invention.

The byte boundary searcher 230 is coupled to the second output terminal OT2 of the selector 220. The byte boundary searcher 230 performs a boundary searching operation on the input data stream DS received by the second output terminal OT2 of the selector 220 so as to generate byte tuning information STI. Therein, the byte tuning information STI is transmitted to the signal receiver 210, and the signal receiver 210 adjusts the clock signal CKIN according to the byte tuning information STI so as to adjust the correspondingly received input data stream DS. In particular, the byte boundary searcher 230 performs a diction operation on the input data stream DS so as to detect a byte shift amount generated by each data byte of the input data stream DS and generates the byte tuning information STI according to the detected byte shift amount generated by each data byte of the input data stream DS. Upon receiving byte tuning information STI, the signal receiver 210 is aware of byte numbers for reversely shifting the data bytes of the input data stream DS so as to adjust the input data stream DS as correct data packets.

Figure 3:
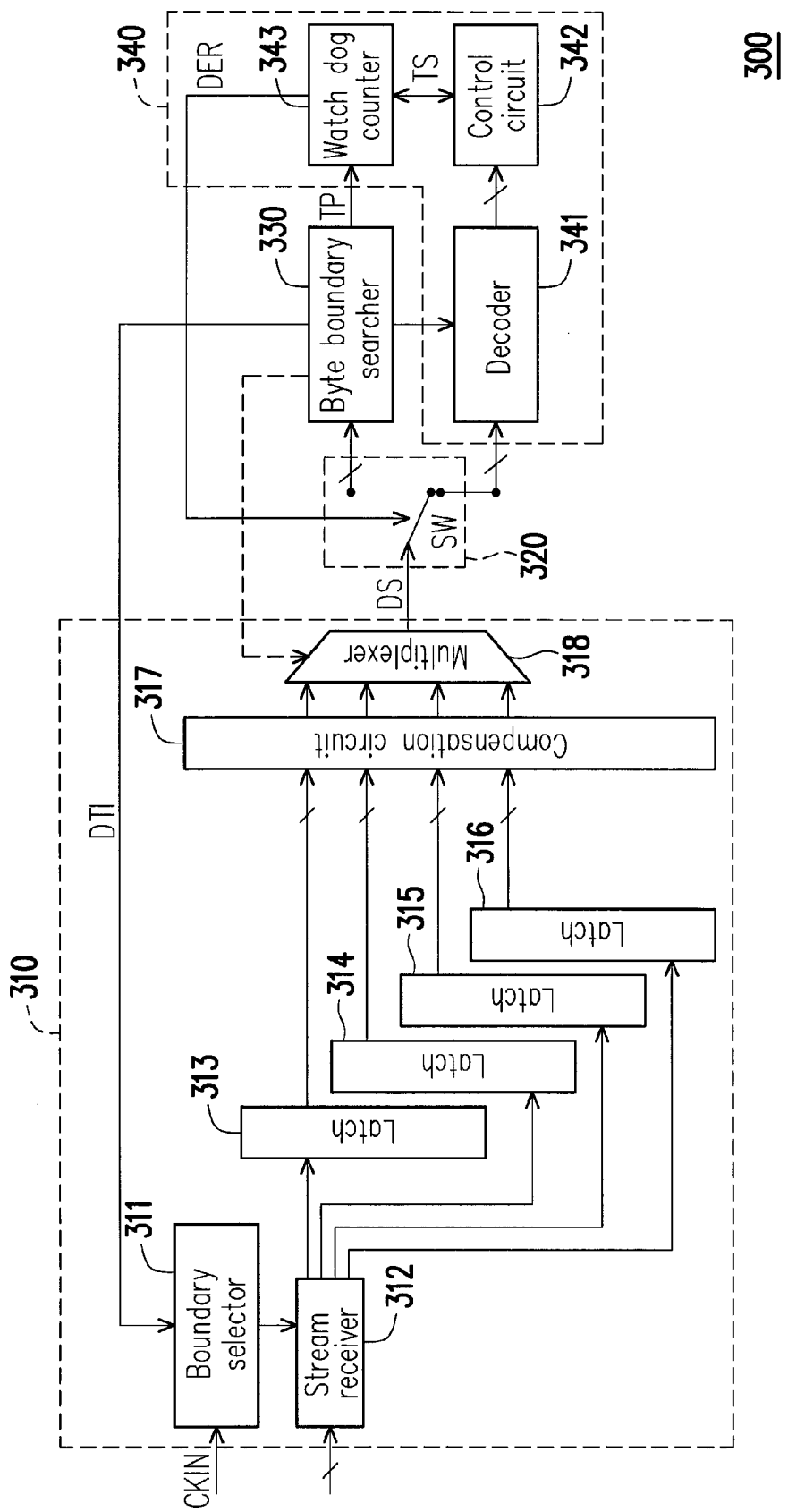
FIG. 3 is a schematic diagram illustrating a signal receiving apparatus 300 according to another embodiment of the present invention.

Referring to FIG. 3, FIG. 3 is a schematic diagram illustrating a signal receiving apparatus 300 according to another embodiment of the present invention. The signal receiving apparatus 300 includes a signal receiver 310, a selector 320, a byte boundary searcher 330 and a decoding apparatus 340. The signal receiver 310 includes a stream receiver 312, a boundary selector 311, latches 313~316, a compensation circuit 317 and a multiplexer 318. The boundary selector 311 is coupled to the byte boundary searcher 330. The boundary selector 311 receives byte tuning information STI and adjusts clock signal CKIN according thereto. In the present embodiment, the boundary selector 311 may insert or deduct a plurality of pulses in or from the clock signal CKIN according to the byte tuning information STI so as to adjust the clock signal CKIN.

The stream receiver 312 is coupled to the boundary selector 311 to receive the clock signal CKIN of original or adjusted by the boundary selector 311 and receive an original input data stream ODS according to the clock signal CKIN. The latches 313~316 are coupled to the stream receiver 312 and respectively configured to temporarily store original input data stream ODS received in different time so as to obtain different channel data streams. The compensation circuit 317 is coupled to the latches 313~316 and performs a compensation operation on the channel data streams stored in the latches 313~316. The multiplexer 318 is coupled to the compensation circuit 317 and selects to output one of the channel data streams so as to generate an input data stream DS.

In the present embodiment, the selector 320 is a switch SW. The switch SW is controlled by the decoding error signal DER to transmit the input data stream DS to the byte boundary searcher 330 or the decoding apparatus 340. The decoding apparatus 340 includes a decoder 341, a control circuit 342 and a watch dog counter 343. The decoder 341 is coupled to the selector 320 and the byte boundary searcher 330. The decoder 341 receives the input data stream DS through the selector 320 for performing the decoding operation to generate a decoded packet. The control circuit 342 is coupled to the decoder 341 and determines whether the decoder 341 is normally operated according to the decoded packet so as to generate a timing start signal TS. The watch dog counter 343 is coupled to the control circuit 342 and receives the timing start signal TS to start a counting operation according thereto.

To be specific, the control circuit 342 receives decoded packet generated by the decoder 341 to determine whether the decoding operation of the decoder 341 is normal and when determining that the decoding operation of the decoder 341 is abnormal, provides the timing start signal TS to start the counting operation of the watch dog counter 343. Meanwhile, when an overflow occurs during the counting operation of the watch dog counter 343, the watch dog counter 343 provides the decoding error signal DER to the selector 320. After receiving the decoding error signal DER, the selector 320 correspondingly transmits the input data stream DS to the byte boundary searcher 330 to perform the boundary searching operation. The byte boundary searcher 330 generates the byte tuning information STI by performing the boundary searching operation on the input data stream DS.

Please refer to both FIG. 3 and FIG. 4 for the boundary searching operation performed by the byte boundary searcher 330. FIG. 4 is a schematic diagram illustrating an error status lookup table 400. Taking the receiving apparatus 300 having four transmission channels (i.e. channel 0~channel 3) for example, the error status lookup table 400 records byte data of a plurality of byte boundaries. Line fields C1~C4 in the error status lookup table 400 respectively correspond to channel 0~channel 3 while row fields R1~R10 in the error status lookup table 400 respectively correspond to various values of the byte boundaries. Values recorded in the row field R6 are generated by channel 0~channel 3 when the data packets are correctly transmitted, which are also referred to as the byte data of a correct byte boundary. Therein, the values stored in the line fields C1~C5 corresponding to the row field R6 are 21, 0, 0, 12 and 39. That is to say, the byte data of the correct byte boundary is 21, 0, 0, 12 and 39. The rest of the row fields R1~R5 and R6~R10 respectively record byte data of the byte boundaries formed by performing byte shifts of different shift amounts on the byte data of the correct byte boundary.

When the byte boundary searcher 330 performs the boundary searching operation on the input data stream DS, it indicates that an error occurs in the input data stream DS if the byte boundary of the input data stream DS is not identical to the byte data of the correct byte boundary. For instance, when the byte boundaries of the input data stream DS are 0, 0, 48 and E4, the byte data of the byte boundaries in the row field R3 and the line fields C1~C4 in the error status lookup table 400 may be corresponding to. Thus, the byte boundary searcher 330 may be aware that during the process of receiving the input data stream DS, surplus pluses are generated in the corresponding clock signal CKIN due to interference. On the other hand, when the byte boundaries of the input data stream DS are 8, 0, 80 and 44, the byte data of the boundaries in the row field R5 and the line fields C1~C4 in the error status lookup table 400 may be corresponding to. Thus, the byte boundary searcher 330 may be aware that during the process of receiving the input data stream DS, pulses which are supposed to be generated in the corresponding clock signal CKIN are deducted due to interference.

Based on the above description, the byte boundary searcher 330 may generate the byte tuning information STI according to the fields corresponding to the byte boundaries of the input data stream DS, such that the boundary selector 311 may insert or deduct a plurality of pulses in or from the clock signal CKIN according to the byte tuning information STI to adjust the clock signal CKIN and further generate the correct input data stream DS.

Additionally, when completely generating the byte tuning information STI, the byte boundary searcher 330 may correspondingly generates a timing stop signal TP and transmit the same to the watch dog counter 343 to stop and reset the counting operation of the watch dog counter 343.

Figure 5:
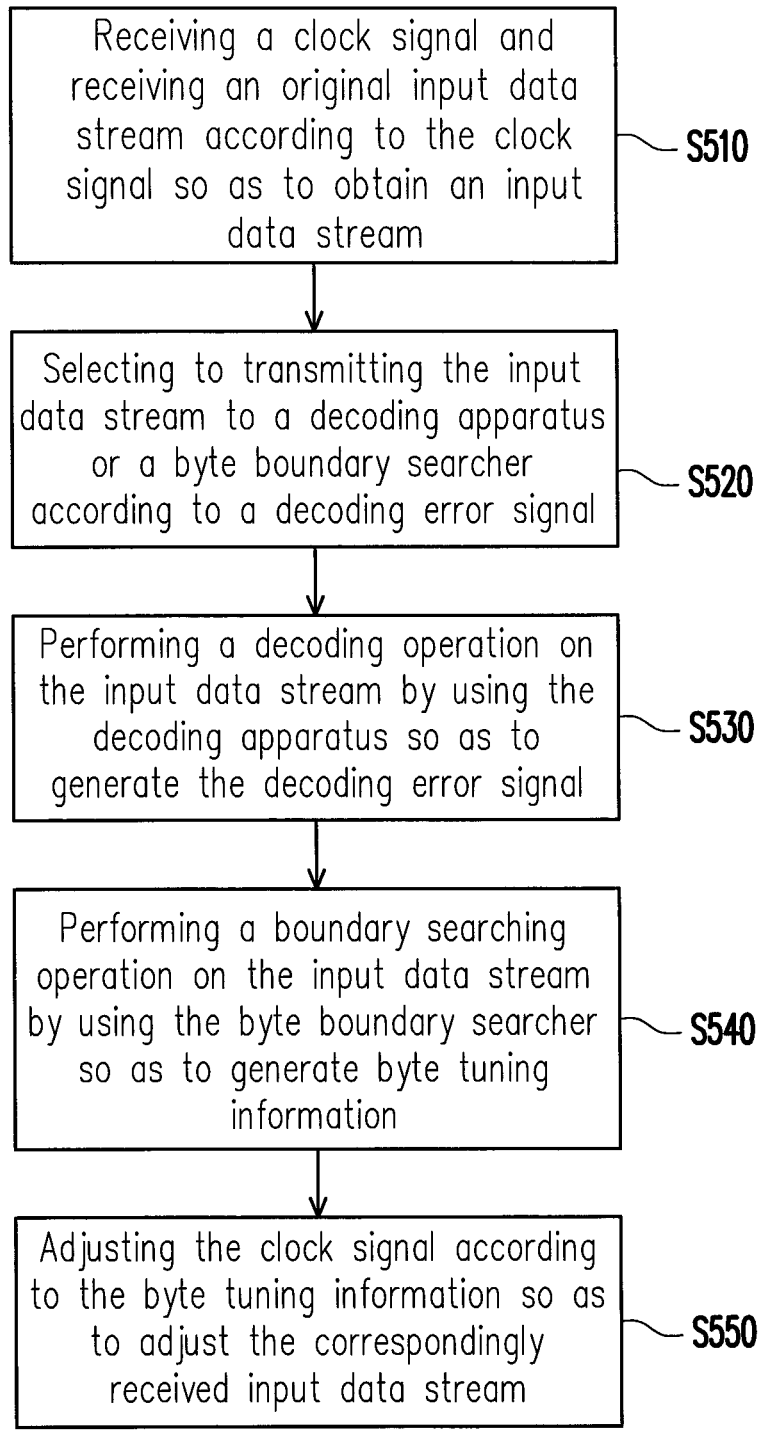
FIG. 5 is a flowchart illustrating a receiving method of a MIPI signal according to an embodiment of the present invention.

Referring to FIG. 5, FIG. 5 is a flowchart illustrating a receiving method of a MIPI signal according to an embodiment of the present invention, which includes the following steps. In step S510, a clock signal is received, and an original input data stream is received according to the clock signal to obtain an input data stream. In step S520, whether to transmit the input data stream to a decoding apparatus or to a byte boundary searcher is selected according to the decoding error signal. Then, in step S530, the input data stream is decoded by using the decoding apparatus so as to generate a decoding error signal. In step S540, a boundary searching operation is performed on the input data stream by using the byte boundary searcher so as to generate byte tuning information. In step S550, the clock signal is adjusted according to the byte tuning information so as to adjust the correspondingly received input data stream.

Based on the above, in the present invention, the boundary searching operation is performed on the input data stream by using the byte boundary searcher so as to generate the byte tuning information, and the clock signal configured as the basis for receiving the original input data stream is adjusted by using the byte tuning information. As such, the input data stream having a byte shift error due to interference may be effectively corrected so as to improve the data accuracy.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A signal receiving apparatus, adapted to receiving a mobile industry processor interface (MIPI) signal, comprising:
    a signal receiver, receiving a clock signal and receiving an original input data stream according to the clock signal to obtain an input data stream;
    a selector, having a first and a second output terminals, coupled to the signal receiver, and selecting to transmit the input data stream to the first output terminal or the second output terminal according to a decoding error signal;
    a decoding apparatus, coupled to the first output terminal of the selector and performing a decoding operation on the input data stream received by the first output terminal of the selector so as to generate the decoding error signal; and
    a byte boundary searcher, coupled to the second output terminal of the selector and performing a boundary searching operation on the input data stream received by the second output terminal of the selector to generate byte tuning information,
    wherein, the signal receiver adjusts the clock signal according to the byte tuning information to adjust the correspondingly received input data stream, the byte boundary searcher generates the byte tuning information by comparing the input data stream with byte data of each of a plurality of byte boundaries, and the byte data of the byte boundaries is formed by performing byte shifts of different shift amounts on a byte data of a correct byte boundary.

2. The signal receiving apparatus according to claim 1, wherein the byte boundary searcher comprises:
    an error status lookup table, configured to record the byte data of the byte boundaries.

3. The signal receiving apparatus according to claim 1, wherein the signal receiver comprises:
    a boundary selector, coupled to the byte boundary searcher and receiving the byte tuning information to insert or deduct a plurality of pluses in or from the clock signal according to the byte tuning information.

4. The signal receiving apparatus according to claim 1, wherein the decoding apparatus comprises:
    a decoder, coupled to the selector and the byte boundary searcher, receiving and decoding the input data stream to generate a decoded packet;
    a control circuit, coupled to the decoder and determining whether the decoder is normal according to the decoded packet so as to generate a timing start signal; and
    a watch dog counter, coupled to the control circuit, receiving the timing start signal and starting a counting operation according to the timing start signal.

5. The signal receiving apparatus according to claim 4, wherein the watch dog counter is further coupled to the selector and generates the decoding error signal when an overflow occurs during the counting operation.

6. The signal receiving apparatus according to claim 4, wherein the byte boundary searcher is further coupled to the watch dog counter, the byte boundary searcher further generates a timing stop signal when generating the byte tuning information, the timing stop signal is transmitted to the watch dog counter to stop and reset the counting operation of the watch dog counter.

7. The signal receiving apparatus according to claim 6, wherein the signal receiver further comprises:
    a stream receiver, coupled to a boundary selector to receive the clock signal and receiving the original input data stream according to the clock signal;
    a plurality of latches, coupled to the stream receiver and temporarily storing the original input data stream received in different time so as to obtain a plurality of channel data streams;

a compensation circuit, coupled to the plurality of latches and performing a compensation operation on the plurality of channel data streams; and a multiplexer, coupled to the compensation circuit and selecting to output one of the plurality of channel data streams so as to generate the input data stream.

8. A method of receiving a mobile industry processor interface (MIPI) signal, comprising:

receiving a clock signal and receiving an original input data stream according to the clock signal so as to obtain an input data stream;

selecting to transmitting the input data stream to a decoding apparatus or a byte boundary searcher according to a decoding error signal;

performing a decoding operation on the input data stream by using the decoding apparatus so as to generate the decoding error signal;

performing a boundary searching operation on the input data stream by using the byte boundary searcher so as to generate byte tuning information, comprises:

comparing the input data stream with byte data of each of a plurality of the byte boundaries by using the byte boundary searcher so as to generate the byte tuning information; and adjusting the clock signal according to the byte tuning information so as to adjust the correspondingly received input data stream, wherein the byte data of the byte boundaries is formed by performing byte shifts of different shift amounts on a byte data of a correct byte boundary.

9. The method according to claim 8, wherein the step of performing the boundary searching operation on the input data stream by using the byte boundary searcher so as to generate the byte tuning information comprises:

recording the byte data of the byte boundaries.

10. The method according to claim 8, wherein the step of performing the decoding operation on the input data stream by using the decoding apparatus so as to generate the decoding error signal comprises:

receiving and decoding the input data stream so as to generate a decoded packet;

determining whether the decoder is normal according to the decoded packet so as to generate a timing start signal; and receiving the timing start signal and starting a counting operation of a watch dog counter according to the timing start signal and generates the decoding error signal when an overflow occurs during the counting operation of the watch dog counter.

11. The method according to claim 8, wherein the step of adjusting the clock signal according to the byte tuning information so as to adjust the correspondingly received input data stream comprises:

receiving the byte tuning information to insert or deduct a plurality of pluses in or from the clock signal according to the byte tuning information.

* * * * *